(12) United States Patent
Miyazawa

(10) Patent No.: US 10,318,103 B2
(45) Date of Patent: Jun. 11, 2019

(54) INFORMATION PROCESSING APPARATUS, INFORMATION PROCESSING METHOD, AND PROGRAM

(71) Applicant: SONY CORPORATION, Tokyo (JP)

(72) Inventor: Yusuke Miyazawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 139 days.

(21) Appl. No.: 15/130,467

(22) Filed: Apr. 15, 2016

(65) Prior Publication Data

US 2016/0266765 A1 Sep. 15, 2016

Related U.S. Application Data

(63) Continuation of application No. 13/661,248, filed on Oct. 26, 2012, now Pat. No. 9,342,167.

(30) Foreign Application Priority Data

Nov. 1, 2011 (JP) .................................. 2011-240189

(51) Int. Cl.
*G06F 3/041* (2006.01)
*G06F 3/0481* (2013.01)
*G06F 3/0488* (2013.01)

(52) U.S. Cl.
CPC .......... *G06F 3/04815* (2013.01); *G06F 3/041* (2013.01); *G06F 3/0488* (2013.01); *G06F 3/04883* (2013.01); *G06F 2203/04101* (2013.01); *G06F 2203/04105* (2013.01)

(58) Field of Classification Search
CPC . G06F 2203/04101; G06F 2203/04105; G06F 3/041; G06F 3/04815; G06F 3/0488; G06F 3/04883
See application file for complete search history.

(56) References Cited

U.S. PATENT DOCUMENTS

| 5,315,703 | A | * | 5/1994 | Matheny | ................. | G06F 9/542 715/700 |
| 2009/0027353 | A1 | | 1/2009 | Im et al. | | |
| 2009/0251420 | A1 | | 10/2009 | Do et al. | | |
| 2010/0095206 | A1 | | 4/2010 | Kim | | |
| 2011/0041098 | A1 | * | 2/2011 | Kajiya | ................. | G06F 3/04815 715/849 |
| 2011/0246877 | A1 | * | 10/2011 | Kwak | ................... | G06F 3/0488 715/702 |

(Continued)

OTHER PUBLICATIONS

Aidan Chopra, "Google SketchUp for Dummies," Wiley Publishing, Inc., 2007, Introduction, pp. 1-6.*

(Continued)

*Primary Examiner* — Sing-Wai Wu
(74) *Attorney, Agent, or Firm* — Paratus Law Group, PLLC

(57) ABSTRACT

Provided is an information processing apparatus including an operation amount acquiring unit that acquires an operation amount of an operation input on a display screen; a depth position computing unit that computes a depth position of a three-dimensionally viewable operation object, on the basis of the operation amount; and a display processing unit that executes processing for adjusting the depth position of the operation object on the basis of the depth position and displaying the operation object on the display screen.

13 Claims, 11 Drawing Sheets

(56) References Cited

U.S. PATENT DOCUMENTS

| | | | |
|---|---|---|---|
| 2011/0254865 A1 | 10/2011 | Yee et al. | |
| 2011/0281619 A1* | 11/2011 | Cho | G06F 3/04817 |
| | | | 455/566 |
| 2012/0076399 A1 | 3/2012 | Yamaji et al. | |
| 2012/0092457 A1* | 4/2012 | Sugino | H04N 13/286 |
| | | | 348/46 |
| 2012/0133645 A1* | 5/2012 | Jung | H04N 13/128 |
| | | | 345/419 |

OTHER PUBLICATIONS

Harwood Podcast, Youtube video: "Sketchup #9: The Move Tool," Published on Dec. 19, 2010. https://www.youtube.com/watch?v=wNjyBm6n_-8.*

* cited by examiner

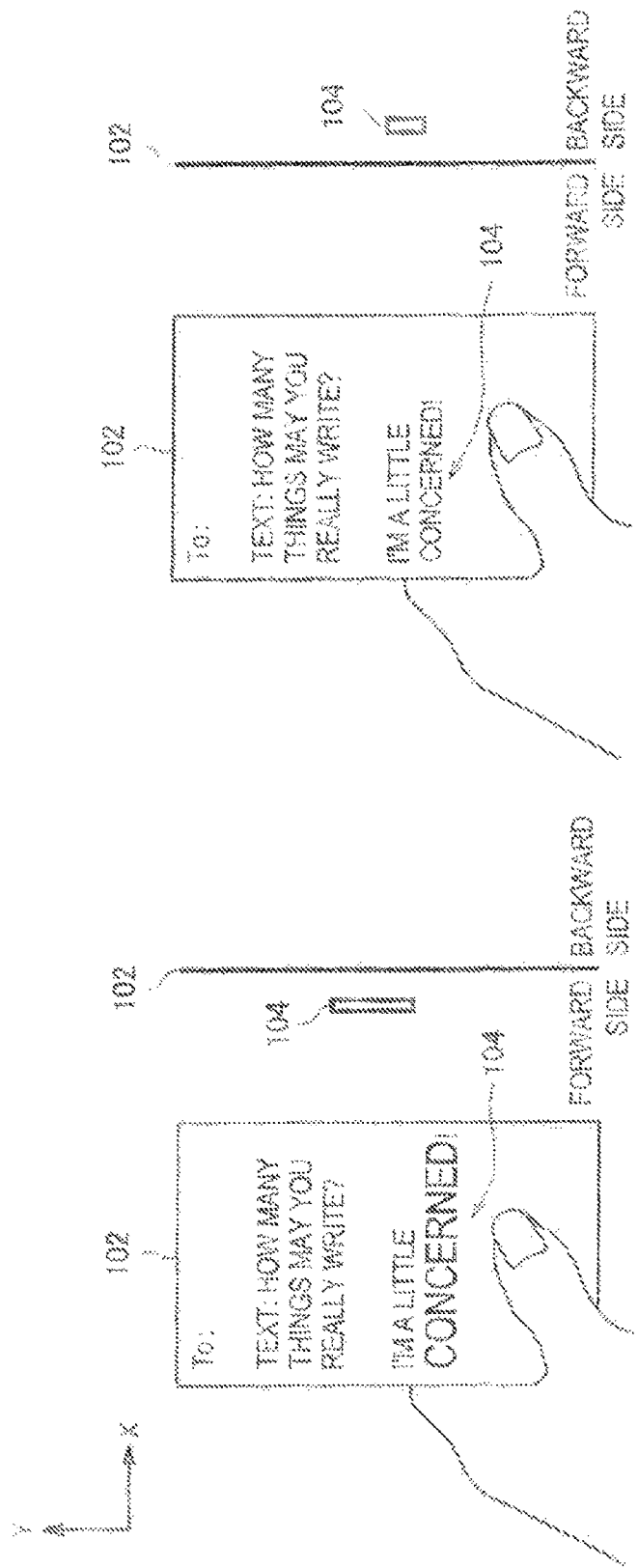

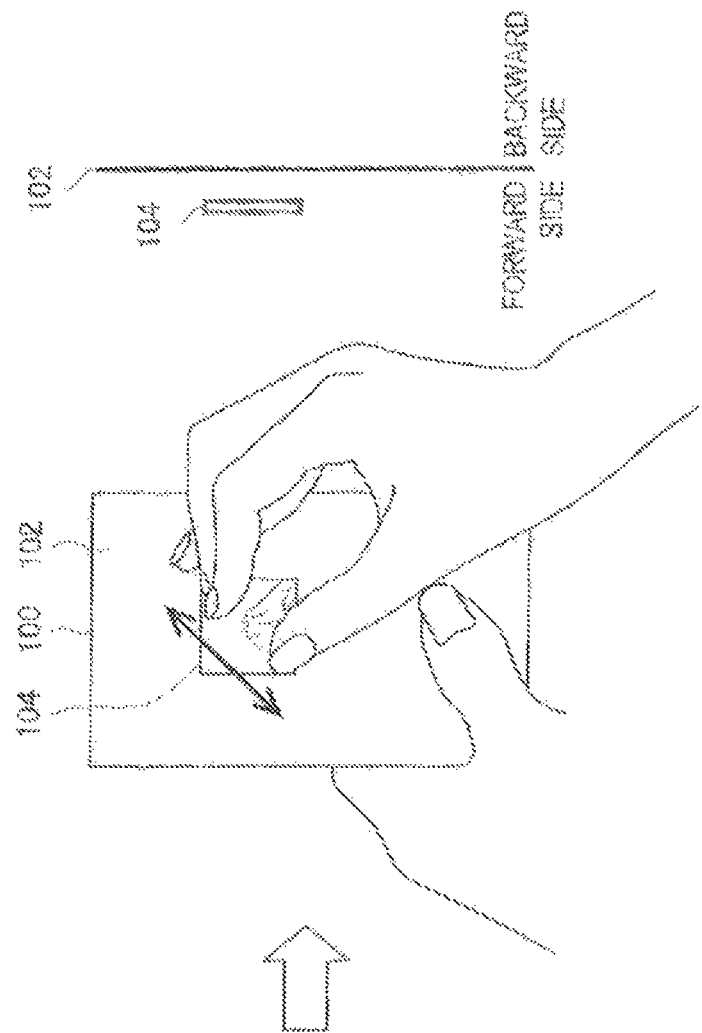
FIG. 3C
FIG. 3B
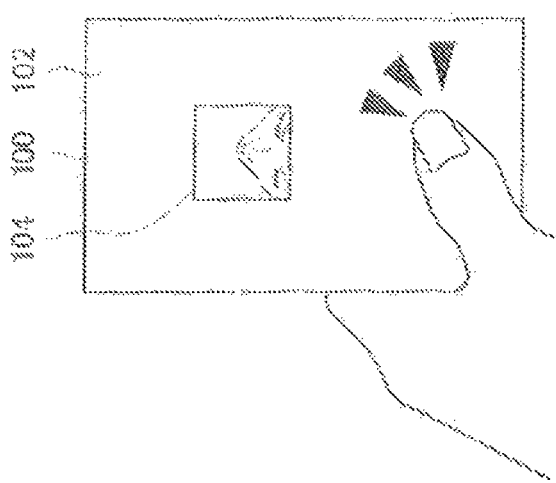
FIG. 3A

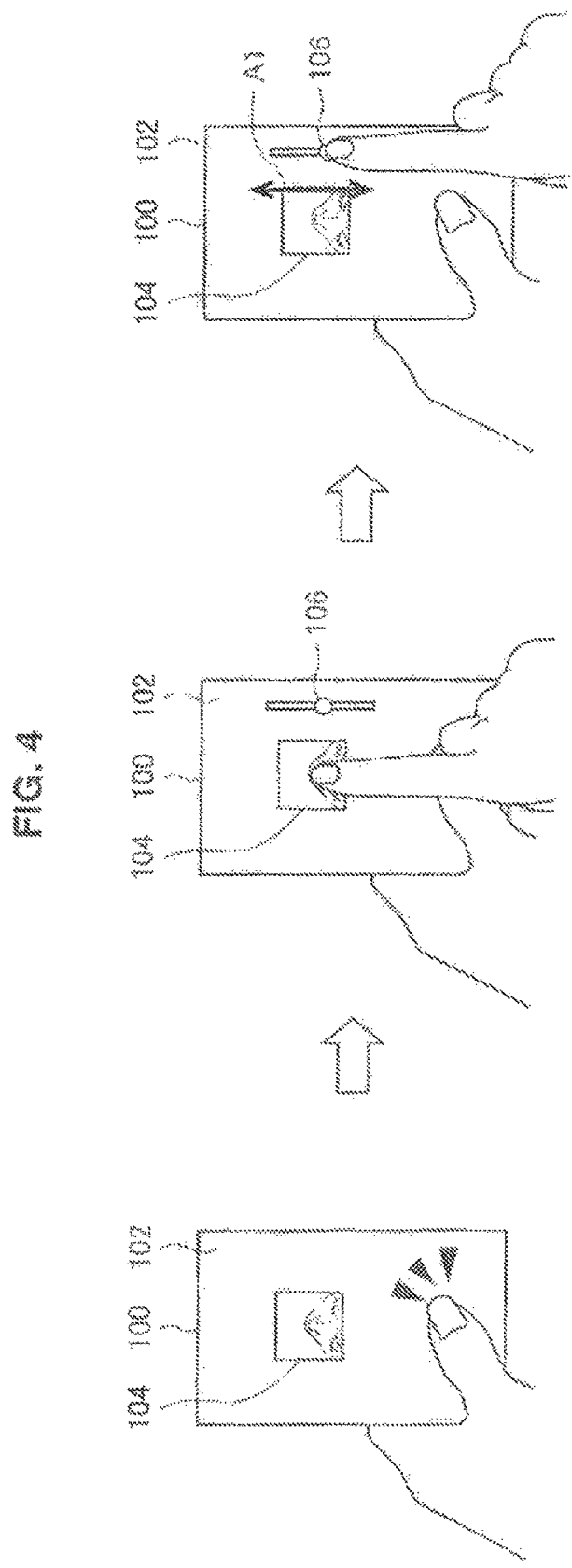

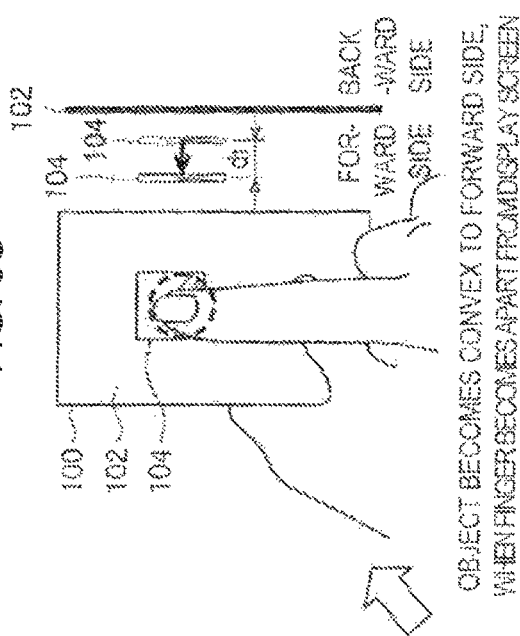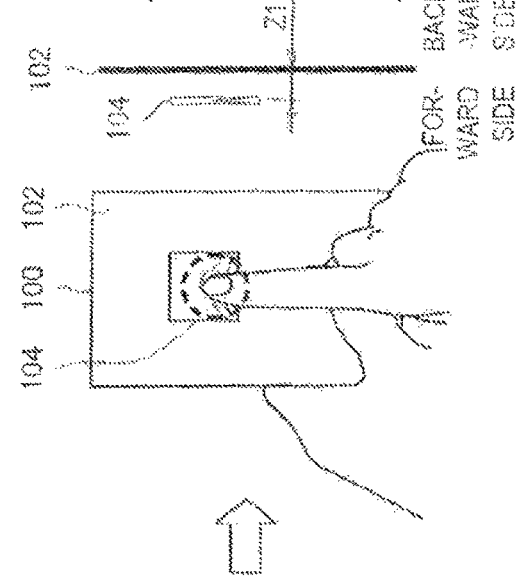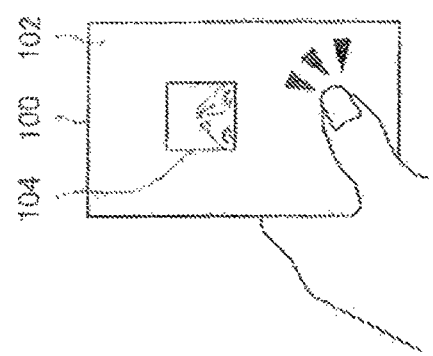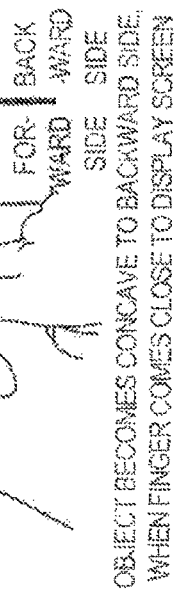
FIG. 6A
FIG. 6B
FIG. 6C
OBJECT BECOMES CONVEX TO FORWARD SIDE, WHEN FINGER BECOMES APART FROM DISPLAY SCREEN
FIG. 6D
OBJECT BECOMES CONCAVE TO BACKWARD SIDE, WHEN FINGER COMES CLOSE TO DISPLAY SCREEN

INFORMATION PROCESSING APPARATUS, INFORMATION PROCESSING METHOD, AND PROGRAM

CROSS REFERENCE TO PRIOR APPLICATION

This application is a continuation of U.S. patent application Ser. No. 13/661,248 (filed on Oct. 26, 2012), which claims priority to Japanese Patent Application No. 2011-240189 (filed on Nov. 1, 2011), which are all hereby incorporated by reference in their entirety

BACKGROUND

The present disclosure relates to an information processing apparatus, an information processing method, and a program.

Recently, computational capabilities and communication speeds of information processing apparatuses have been improved dramatically. However, in a relatively small information processing apparatus such as a portable terminal, because a size of a display unit to display a processing result is limited, an amount of information that can be displayed is limited and high performance may not be sufficiently used.

Therefore, technologies for using the display unit of the information processing apparatus effectively have been developed. For example, technology for providing a touch panel in the display unit to realize securing operability and enlarging the display unit at the same time has been known. Specifically, technology for using a pressing condition of the touch panel as an operation input has been described in Japanese Patent Application Laid-Open (JP-A) Nos. 2010-109552 and 2009-009252.

In recent years, three-dimensional displays and content for the three-dimensional displays have increased. In particular, three-dimensional displays for mobile devices mounted with the touch panels have been spread.

SUMMARY

However, it is generally necessary to use a picture photographed by a special stereoscopic camera or edit a photographed image using special software for professionals, such as a CAD, in order to generate three-dimensionally viewable content. As such, technology for allowing a user to easily generate content having depth is not yet spread and it is difficult for the user to easily generate the content having the depth to be three-dimensionally viewed.

Thus, it is desirable to generate three-dimensionally viewable content with a simple operation.

According to an embodiment of the present disclosure, there is provided an information processing apparatus which includes an operation amount acquiring unit that acquires an operation amount of an operation input on a display screen, a depth position computing unit that computes a depth position of a three-dimensionally viewable operation object, on the basis of the operation amount, and a display processing unit that executes processing for adjusting the depth position of the operation object on the basis of the depth position and displaying the operation object on the display screen.

According to another embodiment of the present disclosure, there is provided an information processing method which includes acquiring an operation amount of an operation input on a display screen, computing a depth position of a three-dimensionally viewable operation object, on the basis of the operation amount, and adjusting the depth position of the operation object on the basis of the depth position and displaying the operation object on the display screen.

According to another embodiment of the present disclosure, there is provided a program for causing a computer to execute acquiring an operation amount of an operation input on a display screen, computing a depth position of a three-dimensionally viewable operation object, on the basis of the operation amount, and adjusting the depth position of the operation object on the basis of the depth position and displaying the operation object on the display screen.

According to the embodiments of the present disclosure described above, three-dimensionally viewable content can be generated with a simple operation.

BRIEF DESCRIPTION OF THE DRAWINGS

FIGS. 2A and 2B are schematic views illustrating an operation for changing a depth position of a specific character by the information processing apparatus according to the embodiment;

FIGS. 3A to 3C are schematic views illustrating an operation when the information processing apparatus includes a normal touch panel in a display screen;

FIG. 4 is a schematic view illustrating an example of the case in which an operation member such as a slider is displayed on the display screen and a depth position of an operation object is adjusted by an operation of the operation member;

FIGS. 6A to 6D are schematic views illustrating an outline of an operation of a proximity touch panel;

DETAILED DESCRIPTION OF THE EMBODIMENT(S)

Figure 1:
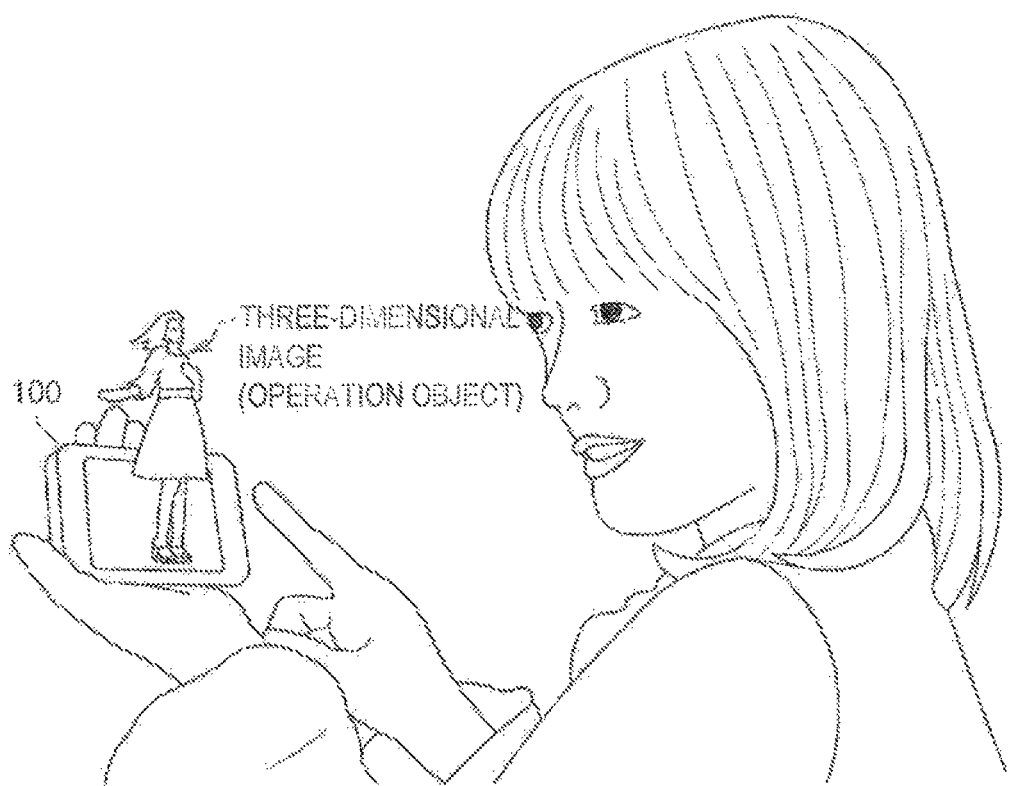
FIG. 1 is a schematic view illustrating an aspect of the case in which a user operates an information processing apparatus according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The following description will be made in the order described below.

1. Outline of Embodiment
2. Method of Preventing Overlapping of Objects according to Depth Adjustment
3. Details of Operation for Adjusting Depth Position
3-1. Case of Normal Touch Panel
3-2. Example of Proximity Touch Panel
3-3. Pressure-Sensitive Touch Panel
4. Example of Configuration of Information Processing Apparatus
5. Example of Processing in Information Processing Apparatus
5-1. Case of Normal Touch Panel
5-2. Case of Proximity Much Panel
5-3. Case of Pressure-Sensitive Touch Panel (1. Outline of Embodiment)

FIG. 1 is a schematic view illustrating an aspect of the case in which a user operates an information processing apparatus 100 according to an embodiment of the present disclosure. As illustrated in FIG. 1, this embodiment relates to an operation method of changing a depth position (Z coordinate) of any object with respect to a display screen, by a three-dimensional display (information processing apparatus 100). At this time, as illustrated in FIG. 1, the user can intuitively add a stereoscopic effect to an object in the display screen, by making a gesture that can coexist with an existing touch operation, according to a device. In this embodiment, detection using a touch panel, pressure detection, and proximity detection are used as examples of an operation detection method and an operation method suitable for each case is exemplified.

(2. Method of Preventing Overlapping of Objects according to Depth Adjustment)

FIGS. 2A and 2B are schematic views illustrating an operation for changing a depth position of a specific character by the information processing apparatus 100 according to the embodiment. As illustrated in FIGS. 2A and 2B, a depth position of information such as an image or a character is adjusted by an operation using the touch panel. FIGS. 2A and 2B illustrate an example of the case in which a depth direction of a character "concerned" in a text of an email is adjusted. FIG. 2A is a front view of a display screen 102 of the information processing apparatus 100 and a schematic view illustrating a state in which the display screen 102 is viewed from a right side, which illustrates an example of the case in which a position of the character "concerned" in the depth direction is adjusted to a forward side of the display screen 102. FIG. 2B is a front view of the display screen 102 of the information processing apparatus 100 and a schematic view illustrating a state in which the display screen 102 is viewed from the right side, which illustrates an example of the case in which the position of the character "concerned" in the depth direction is adjusted to a backward side of the display screen 102.

As illustrated in FIG. 2A, if the position of the character "concerned" in the depth direction is adjusted to the forward side of the display screen 102, a size of the character "concerned" increases as much as the character is positioned at the forward side. Meanwhile, in FIG. 2B, because the position of the character "concerned" in the depth direction is slightly deeper than the position of the display screen 102, the size of the character "concerned" is almost equal to sizes of characters "I'm a little" and "!" arranged at left and right sides of the character "concerned".

For this reason, in the case of FIG. 2A, processing for shifting the characters "I'm a little" and "!" arranged at the left and right sides of the character "concerned" in leftward and rightward directions (directions shown by arrows in FIG. 2A) is executed. Thereby, when the position of the character "concerned" in the depth direction is adjusted to the forward side of the display screen 102, the characters "I'm a little" and "!" arranged at the left and right sides can be prevented from being covered by the character "concerned". In FIGS. 2A and 2B, the example of the case in which the characters included in the text of the email are adjusted has been illustrated. However, the configuration illustrated in FIGS. 2A and 2B is applicable to the case in which a depth position of another image such as a photo is adjusted.

(3. Details of Operation for Adjusting Depth Position)

Hereinafter, each of three kinds of touch panels (normal touch panel/proximity touch panel/pressure-sensitive touch panel) will be described.

(3-1. Case of Normal Touch Panel)

FIGS. 3A to 3C are schematic views illustrating an operation when the information processing apparatus 100 includes the normal touch panel in the display screen 102. In the operation illustrated in FIGS. 3A to 3C, a depth position of an object is adjusted by a so-called pinch-in/pinch-out operation. The pinch-in/pinch-out operation is an operation for changing a distance (pinch distance) between a thumb and an index finger, as illustrated in FIGS. 3A to 3C.

In this case, when a user normally performs the pinch-in/pinch-out operation, an operation object (for example, a photo or a character) 104 that is displayed on the display screen 102 is enlarged/reduced without a position change in the depth direction.

Meanwhile, as illustrated in FIGS. 3A to 3C, if the user performs the pinch-in/pinch-out operation in a state in which the user presses a predetermined position on the display screen 102 using a left hand, a size of the operation object 104 is not changed and the position of the operation object 104 in the depth direction is adjusted.

Hereinafter, specific explanation is given. First, as illustrated in FIG. 3A, the user presses the display screen 102 with the thumb of the left hand. In this state, the user selects the operation object 104 with an index finger of a right hand. Thereby, a mode changes to a depth change mode. Then, as illustrated in FIG. 3B, the user performs the pinch-in/pinch-out operation with respect to the operation object 104 to change depth information, with the index finger and the thumb of the right band. Thereby, the depth position of the operation object 104 can be adjusted.

FIG. 3C is a schematic view illustrating a state in which the position of the operation object in the depth direction is adjusted, which schematically illustrates a state in which the display screen 102 is viewed from the right side. As illustrated in FIG. 3C, the depth position of the operation object 104 can be adjusted to the forward side of the display screen 102, by performing the pinch-out operation. When the pinch-in operation is performed, the depth position of the operation object 104 can be adjusted to the backward side of the display screen 102.

As such, if the user performs the pinch-in/pinch-out operation with respect to the operation object 104, the depth position of the operation object 104 is changed according to the operation. Thereby, the user can change the depth position of the operation object 104 with a simple operation. In the depth change mode, the size of the operation object 104 does not change and only the depth position of the operation object 104 changes. However, the present disclosure is not limited thereto and both the size and the depth position of the operation object 104 may be changed. In the example illustrated in FIGS. 3A to 3C, the depth position of the operation object 104 is moved to the forward side of the display screen 102, by the pinch-out operation. In addition, the depth position of the operation object 104 is moved to the backward side of the display screen 102, by the pinch-in operation.

Figure 5A:
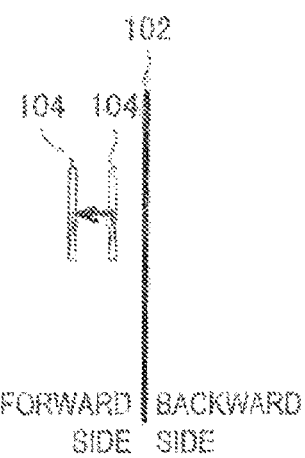
FIGS. 5A and 5B are schematic views illustrating an aspect of the case in which the depth position of the operation object is changed by an operation of the operation member.
Figure 5B:
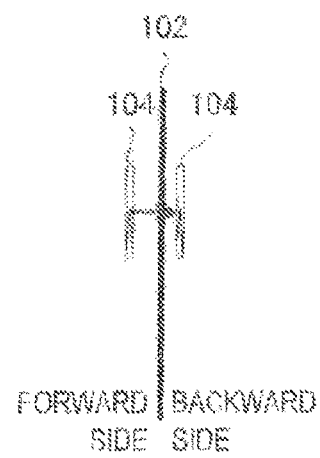

FIG. 4 is a schematic view illustrating an example of the case in which an operation member 106 such as a slider is displayed on the display screen 102 and a depth position of the operation object 104 is adjusted by an operation of the operation member 106. As illustrated in FIG. 4, when the user presses the display screen 102 with the thumb of the left hand and selects the operation object 104 with the index finger of the right hand, the operation member 106 such as the slider is displayed on the display screen 102. Thereby, the mode changes to the depth change mode. In this case, if the user performs a touch operation on the operation member 106 and operates the operation member 106 in a direction (upward-to-downward direction) by an arrow A1 in FIG. 4, the depth position of the operation object 104 changes. For example, if the user operates the operation member 106 in an upward direction, as illustrated in FIG. 5A, the depth position of the operation object 104 moves to the forward side of the display screen 102. If the user operates the operation member 106 in a downward direction, as illustrated in FIG. 5B, the depth position of the operation object 104 moves to the backward side of the display screen 102.

FIGS. 3A to 4 illustrate the example of the case in which the touch panel is arranged on only the surface side of the information processing apparatus 100. However, when the touch panels are arranged on both the surface and a back surface, an operation method in which the operation object 104 on the display screen 102 of the surface side becomes convex when the user tap the touch panel from the back surface and the operation object 104 becomes concave when the user tap the touch panel from the surface is enabled.

(3-2. Example of Proximity Touch Panel)

Next, the case in which the information processing apparatus 100 includes a proximity touch panel will be described. FIGS. 6A to 6D are schematic views illustrating an outline of an operation of the proximity touch panel. In the case of the proximity touch panel, an operation is enabled only by approaching the user's finger to the display screen 102 in a proximity detection region of the proximity touch panel, without touching the display screen 102. The proximity detection region is a range of a predetermined distance above the display screen 102.

First, in a state in which the user presses the display screen 102 with the thumb of the left hand, the user approaches the index finger of the right hand to the display screen 102, as illustrated in FIG. 6A, and stops the index finger above the display screen 102 for a constant time, as illustrated in FIG. 6B. This state is detected by the information processing apparatus 100 and the mode changes to the depth adjustment mode. The proximity distance of the index finger (distance from the index finger of the right hand to the display screen 102) when the mode changes to the depth adjustment mode is associated with the current depth of the operation object 104, the proximity distance and the current depth become a reference, and the depth direction of the operation object is changed according to a change of the proximity distance from the stop position.

In an example illustrated in FIGS. 6A to 6D, the depth position of the operation object 104 is apart from the display screen 102 by Z1 in a forward direction, in a state of FIG. 6B. In this case, if the user approaches the finger to the display screen 102 and a predetermined time passes, a distance D between the user's finger and the display screen is associated with the depth position Z1 of the operation object 104, the distance D and the depth position Z1 become a reference, and the mode changes to the depth adjustment mode. Then, as illustrated in FIG. 6C, if the user moves the finger to a position apart from the display screen 102 by d1 in a forward direction, the depth position of the operation object 104 moves by d1 in a forward direction. Then, as illustrated in FIG. 6D, if the user moves the finger to a position apart from the display screen 102 by d2 in a backward direction, the depth position of the operation object 104 moves by d2 in a backward direction.

When the depth adjustment mode is cancelled, the user performs an operation for moving the finger by a constant distance or more in an x direction or a y direction (direction parallel to the display screen 102) or separating the thumb of the left hand from the display screen. Thereby, the depth adjustment mode is cancelled.

(3-3. Pressure-Sensitive Touch Panel)

Next, the case in which the information processing apparatus 100 includes a pressure-sensitive touch panel will be described. An operation when the pressure-sensitive touch panel is used is similar to the operation when the proximity touch panel is used. In the case of the pressure-sensitive touch panel, an operation is enabled when the user presses the display screen 102 in a pressing force detection region of the pressure-sensitive touch panel with the finger. First, similar to the case of the proximity touch panel, the user presses the display screen 102 with the thumb of the left hand. Then, if the user continuously presses the operation object 104 on the display screen 102 with the index finger of the right hand using the pressing force of a constant value or more, for a time longer than the predetermined time, the mode changes to the depth adjustment mode. Then, the depth position of the operation object 104 is changed according to the pressing force of the user. For example, when the pressing force is more than 100 g, the depth position of the operation object 104 moves to the backward side of the display screen and if the pressing force is 100 g or less, the depth position of the operation object moves to the forward side of the display screen.

Even in the case of the pressure-sensitive touch panel, when the depth adjustment mode is cancelled, the user moves the finger by the constant distance or more in the x and y directions or separates the thumb from the display screen. Thereby the depth adjustment mode is cancelled.

(4. Example of Configuration of Information Processing Apparatus)

Figure 7:
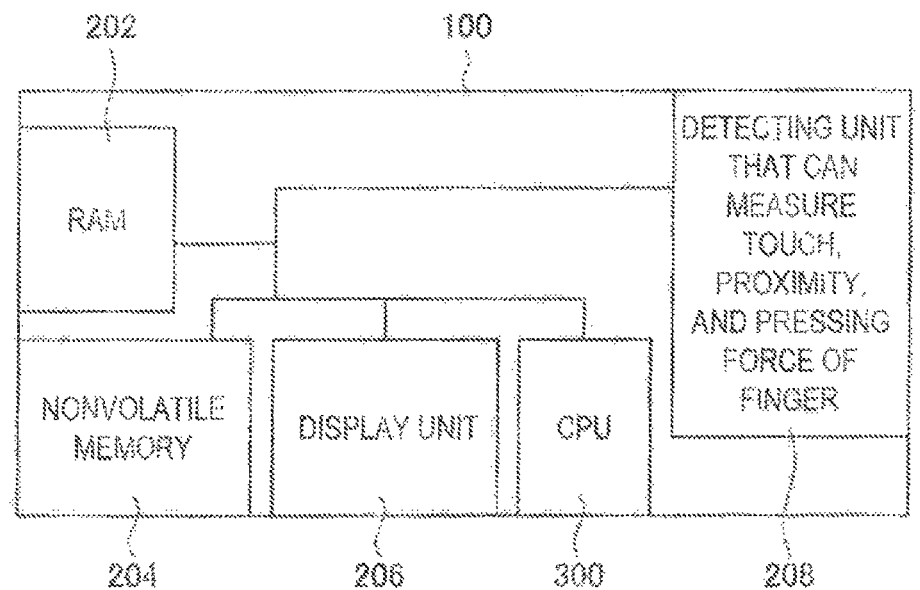
FIG. 7 is a schematic view illustrating an example of a configuration of the information processing apparatus.

FIG. 7 is a schematic view illustrating an example of a configuration of the information processing apparatus 100. As illustrated in FIG. 7, the information processing apparatus 100 includes a RAM 202, a nonvolatile memory 204, a display unit 206 such as an LCD or an organic EL, a CPU 300, and a detecting unit 208 that can detect the touch, the proximity, and the pressing force of the finger. The information processing apparatus 100 detects the operation of the user by the detecting unit 208, computes the depth position of the operation object 104 by the CPU 300, on the basis of the detected operation, adjusts the display of the display unit 206, and adjusts the depth position. In the configuration illustrated in FIG. 7, data that is displayed on the display unit 206 is temporarily held in the RAM 202. Programs that operate the CPU 300 are stored in the nonvolatile memory 206. The display unit 206 is configured using a three-dimensional display (3D display). For example, the display unit 206 causes a left eye image and a right eye image to be incident on a left eye and a right eye of the user using a polarization plate system and enables the user to view a three-dimensional image. The detecting unit 208 corresponds to the touch sensor, the proximity sensor, or the pressure-sensitive sensor described above. Each of the touch sensor and the proximity sensor can be configured using a capacitive sensor.

Figure 8:
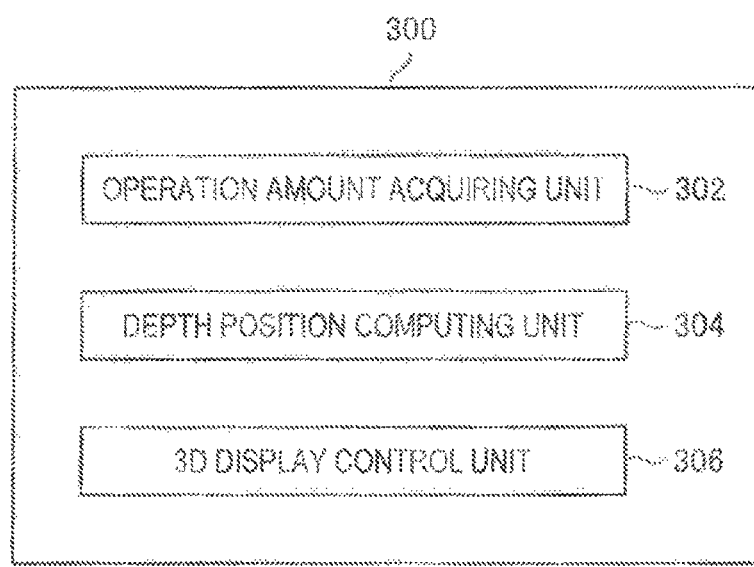
FIG. 8 is a block diagram illustrating a functional configuration of a CPU.

FIG. 8 is a block diagram illustrating a functional configuration of the CPU 300. In order to adjust the depth position described above, the CPU 300 is configured to include an operation amount acquiring unit 302, a depth position computing unit 304, and a 3D display control unit 306. The operation amount acquiring unit 302 acquires an operation amount of an operation input from the user, which is detected by the detecting unit 208. The depth position computing unit 304 computes the depth position of the three-dimensionally viewable operation object, on the basis of the operation amount. The 3D display control unit 306 executes processing for adjusting the depth position of the operation object 304 on the basis of the depth position and displaying the operation object 304 on the display screen 102. The depth position of the operation object 304 is adjusted by adjusting parallax of the left eye image and the right eye image. The 3D display control unit 306 executes the processing (illustrated in FIGS. 3A to 6D) for adjusting the depth position and displaying the operation object and the processing (illustrated in FIG. 2) for moving the peripheral display object according to the change in the depth position of the operation object 106. Each block illustrated in FIG. 8 can be configured using the CPU 300 and the program (software) to operate the CPU 300. In this case, the programs can be stored in the nonvolatile memory 204, an externally connected USB memory, and a recording medium such as an optical disk.

(5. Example of Processing in Information Processing Apparatus)

Hereinafter, each processing in the information processing apparatus 100 that corresponds to each of the three kinds of touch panels (normal touch panel/proximity touch panel/pressure-sensitive touch panel) will be described.

(5-1. Case of Normal Much Panel)

Figure 9:
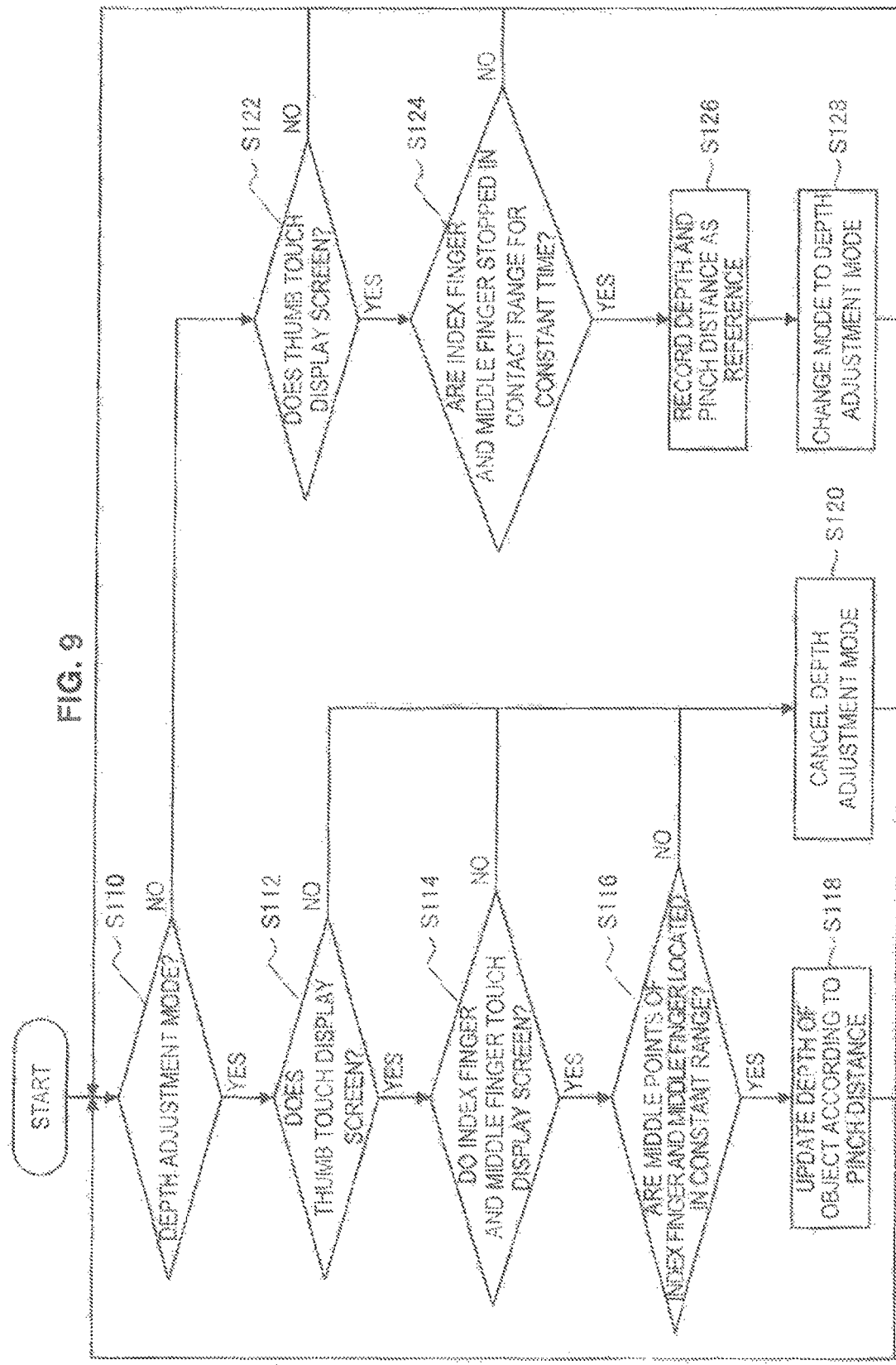
FIG. 9 is a flowchart illustrating processing in the case of using the normal touch panel.
Figure 10:
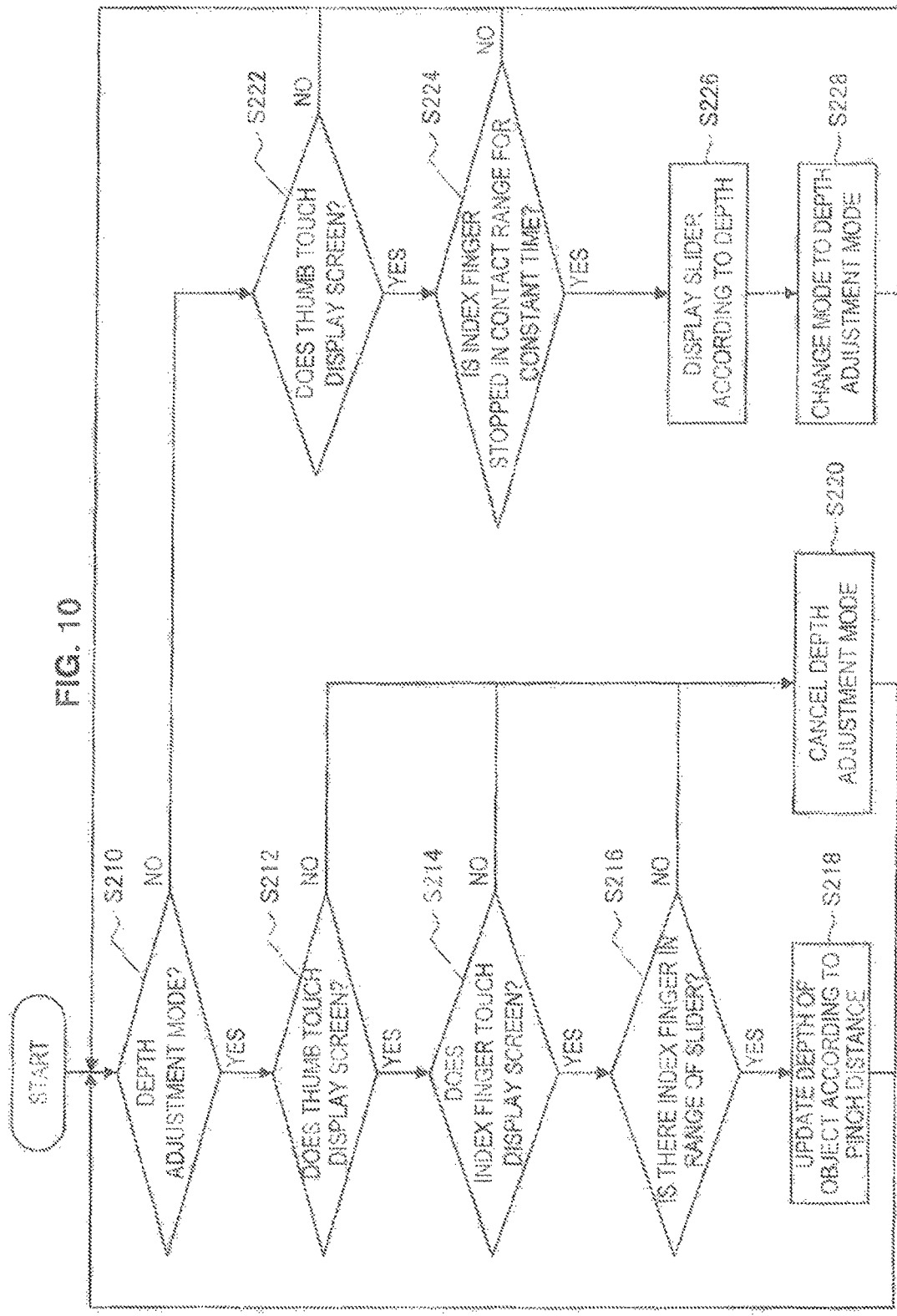
FIG. 10 is a flowchart illustrating processing in the case of using the normal touch panel.

FIGS. 9 and 10 are flowcharts illustrating processing in the case of using the normal touch panel. With respect to the normal touch panel, two processing of FIGS. 9 and 10 will be described.

In an example illustrated in FIG. 9, the depth position of the operation object 104 is adjusted by the pinch-in/pinch-out operation. First, in step S110, it is determined whether the mode is the depth adjustment mode. When it is determined that the mode is the depth adjustment mode, the process proceeds to step S112 and it is determined whether the thumb touches the display screen 102. When it is determined that the thumb touches the display screen 102 ("Yes"), the process proceeds to step S114. In step S114, it is determined whether the index finger and the middle finger touch the display screen 102. When it is determined that the index finger and the middle finger touch the display screen 102 ("Yes"), the process proceeds to step S116. In step S116, it is determined whether there are middle points of the index finger and the middle finger in a constant range. When it is determined that there are the middle points of the index finger and the middle finger in the constant range ("Yes"), the process proceeds to step S118. In this case, the constant range is a constant range that includes the operation object 104. In step S118, the depth position of the operation object 104 is adjusted (updated) according to the pinch distance.

Meanwhile, when the determination results of steps S112, S114, and S116 are "No", the process proceeds to step S120 and the depth adjustment mode is cancelled.

When it is determined in step S110 that the mode is not the depth adjustment mode ("No"), the process proceeds to step S122. In step S122, it is determined whether the thumb touches the display screen 102. When it is determined that the thumb touches the display screen 102 ("Yes"), the process proceeds to step S124. In step S124, it is determined whether the index finger and the middle finger are stopped in a constant range for a constant time. In this case, the constant range is a constant range that includes the operation object 104. When it is determined in step S124 that the index finger and the middle finger are stopped in the constant range for the constant time ("Yes"), the process proceeds to step SCH. In step SCH, the depth position of the operation object and the pinch distance (distance between the index finger and the middle finger) are recorded as a reference. Next, in step S118, the mode changes to the depth adjustment mode.

Meanwhile, when the determination results of steps S122 and S124 are "No", the mode does not change to the depth adjustment mode, the process returns to step S110, and the following processing is repeated.

Next, processing of FIG. 10 using the normal touch panel will be described. In an example illustrated in FIG. 10, the depth position of the operation object 104 is adjusted by the operation of the operation member 106. First, in step S210, it is determined whether the mode is the depth adjustment mode. When it is determined that the mode is the depth adjustment mode, the process proceeds to step S212 and it is determined whether the thumb touches the display screen 102. When it is determined that the thumb touches the display screen 102 ("Yes"), the process proceeds to step S214. In step S214, it is determined whether the index finger touches the display screen 102. When it is determined that the index finger touches the display screen 102 ("Yes"), the process proceeds to step S216. In step S216, it is determined whether there is the index finger in a range of the operation member 106 such as the slider. When it is determined that there is the index finger in the range of the operation member 106 such as the slider ("Yes"), the process proceeds to step S218. In step S218, the depth position of the operation object 104 is adjusted (updated) according to the movement distance of the operation member 106.

Meanwhile, when the determination results of steps S212, S214, and S216 are "No", the process proceeds to step S220 and the depth adjustment mode is cancelled.

When it is determined in step S210 that the mode is not the depth adjustment mode ("No"), the process proceeds to step S222. In step S222, it is determined whether the thumb touches the display screen 102. When it is determined that the thumb touches the display screen 102 ("Yes"), the process proceeds to step S224. In step S224, it is determined whether the index finger is stopped in a constant range for a constant time. In this case, the constant range is a constant range that includes the operation object 104. When it is determined in step S224 that the index finger is stopped in the constant range for the constant time ("Yes"), the process proceeds to step S226. In step S226, the depth position of the operation object 104 and the position of the operation member 106 (position of the slider) are recorded as a reference. Next, in step S228, the mode changes to the depth adjustment mode.

Meanwhile, when the determination results of steps S222 and S224 are "No", the mode does not change to the depth adjustment mode, the process returns to step S210, and the following processing is repeated.

(5-2. Case of Proximity Touch Panel)

Figure 11:
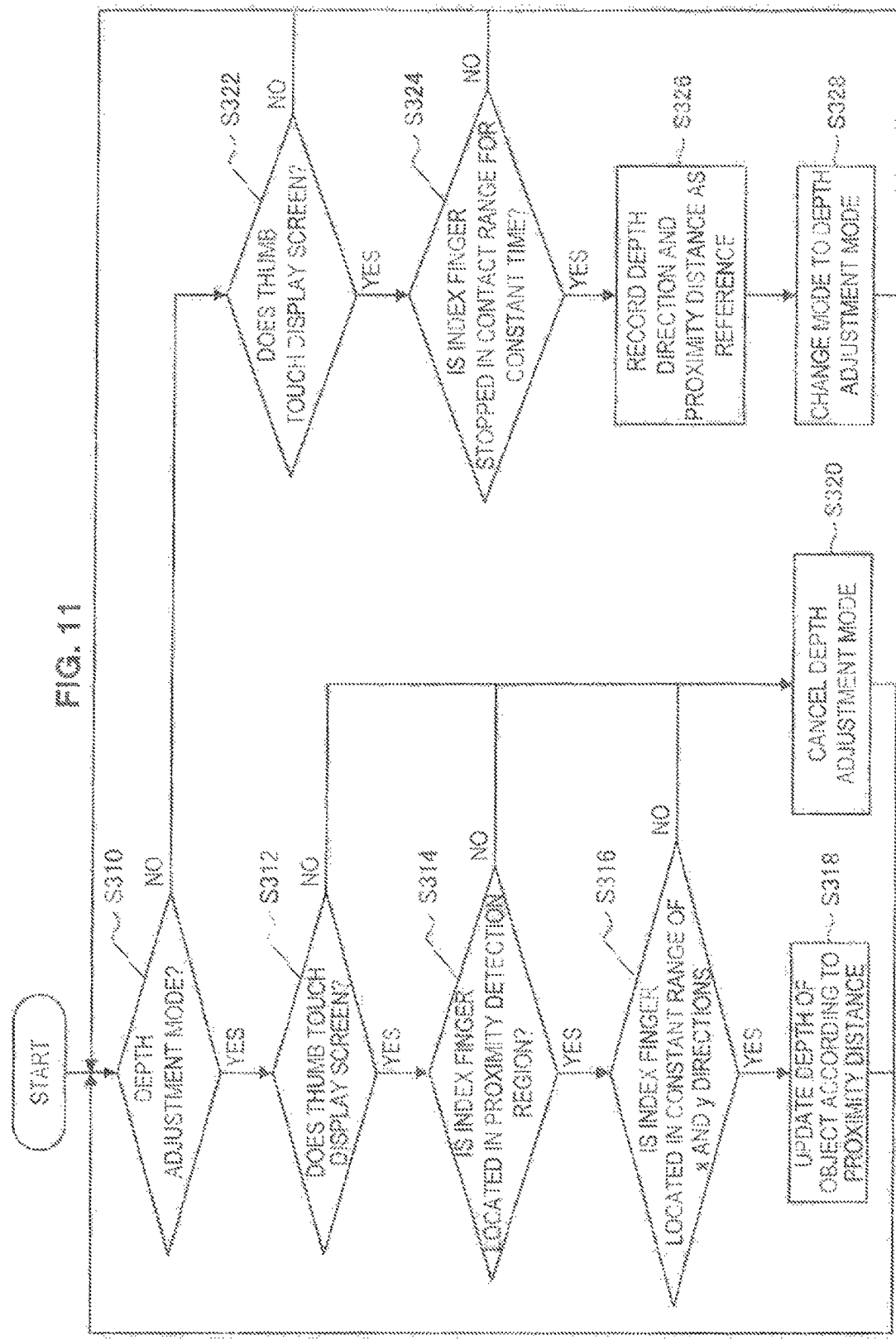
FIG. 11 is a flowchart illustrating processing for adjusting the depth position of the operation object by an operation of the proximity touch panel.

In an example illustrated in FIG. 11, the depth position of the operation object 104 is adjusted by the operation of the proximity touch panel. First, in step S310, it is determined whether the mode is the depth adjustment mode. When it is determined that the mode is the depth adjustment mode, the process proceeds to step S312 and it is determined whether the thumb touches the display screen 102. When it is determined that the thumb touches the display screen 102 ("Yes"), the process proceeds to step S314. In step S314, it is determined whether there is the index finger in the proximity detection region. When it is determined that there is the index finger in the proximity detection region ("Yes"), the process proceeds to step S316. In step S316, it is determined whether there is the index finger in a constant range of the x and y directions. When it is determined that there is the index finger in the constant range ("Yes"), the process proceeds to step S318. In this case, the constant range is a constant range that includes an upper side of the operation object 104. In step S318, the proximity distance of the finger is detected and the depth position of the operation object 104 is adjusted (updated) according to the proximity distance.

Meanwhile, when the determination results of steps S312, S314, and S316 are "No", the process proceeds to step S320 and the depth adjustment mode is cancelled.

When it is determined in step S310 that the mode is not the depth adjustment mode ("No"), the process proceeds to step S322. In step S322, it is determined whether the thumb touches the display screen 102. When it is determined that the thumb touches the display screen 102 ("Yes"), the process proceeds to step S324. In step S324, it is determined whether the index finger is stopped in a constant range for a constant time. In this case, the constant range is a constant range above the operation object 104 in the proximity detection region. When it is determined in step S324 that the index finger is stopped in the constant range for the constant time ("Yes"), the process proceeds to step S326. In step S326, the depth position of the operation object 104 and the proximity distance (distance between the finger and the display screen 104) are recorded as a reference. Next, in step S328, the mode changes to the depth adjustment mode.

Meanwhile, when the determination results of steps S322 and S324 are "No", the mode does not change to the depth adjustment mode, the process returns to step S310, and the following processing is repeated. As described above, if the finger is stopped for the constant time or more in a state in which the proximity of the finger is detected, the mode changes to the depth adjustment mode. If the proximity distance is changed in the depth adjustment mode, the depth of the operation object 106 that is an adjustment object is relatively changed. When the finger moves by the constant distance or more in the x and y directions, the depth adjustment mode is cancelled and the mode changes to a normal touch mode.

(5-3. Case of Pressure-Sensitive Touch Panel)

Figure 12:
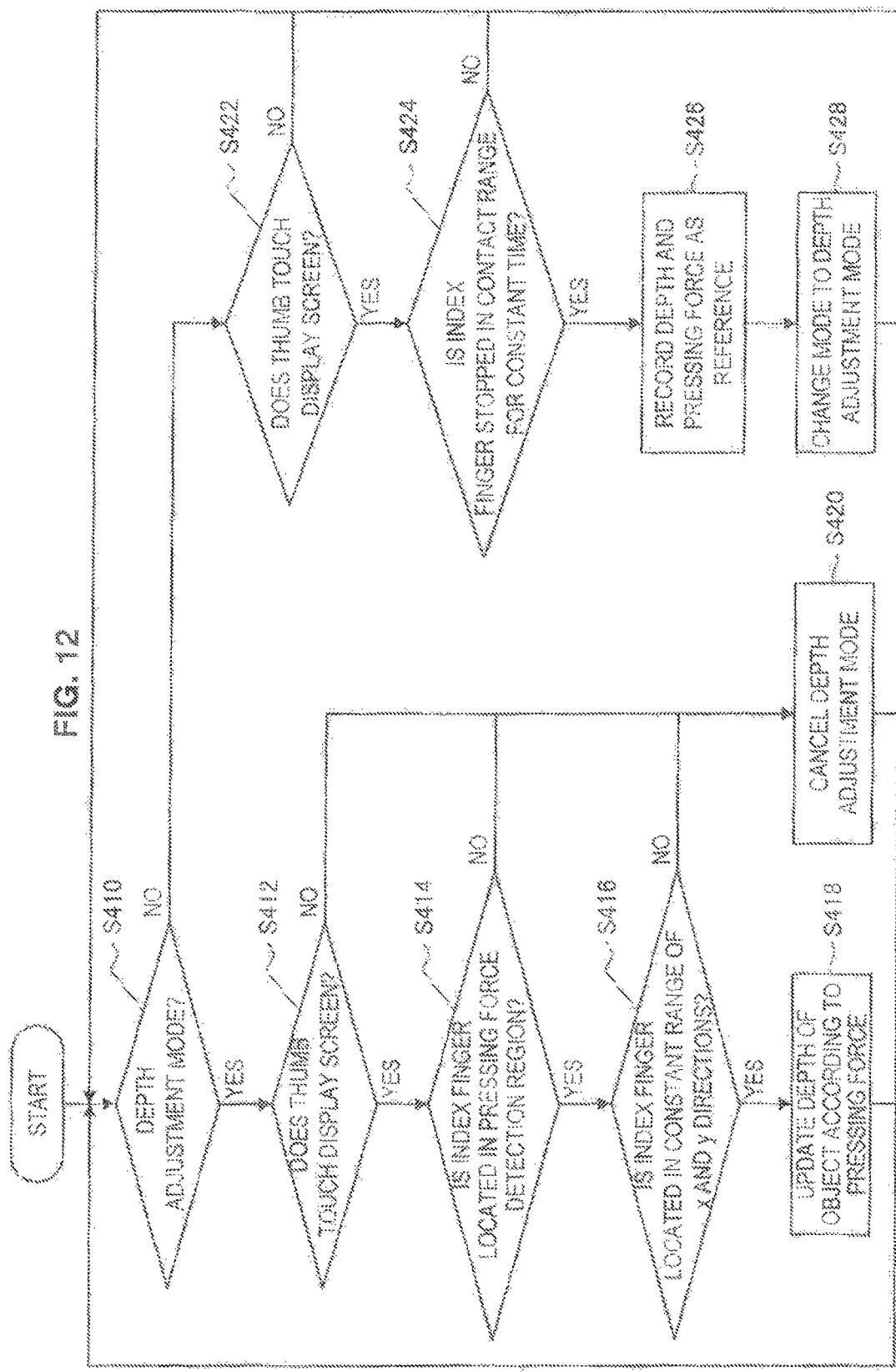
FIG. 12 is a flowchart illustrating processing for adjusting the depth position of the operation object by an operation of a pressure-sensitive touch panel.

In an example illustrated in FIG. 12, the depth position of the operation object 104 is adjusted by the operation of the pressure-sensitive touch panel. First, in step S410, it is determined whether the mode is the depth adjustment mode. When it is determined that the mode is the depth adjustment mode, the process proceeds to step S412 and it is determined whether the thumb touches the display screen 102. When it is determined that the thumb touches the display screen 102 ("Yes"), the process proceeds to step S414. In step S414, it is determined whether there is the index finger in the pressing three detection region. When it is determined that there is the index finger in the pressing three detection region ("Yes"), the process proceeds to step S416. In step S416, it is determined whether there is the index finger in a constant range of the x and y directions. When it is determined that there is the index finger in the constant range ("Yes"), the process proceeds to step S418. In this case, the constant range is a constant range that includes the upper side of the operation object 104. In step S418, the pressing force of the finger is detected and the depth position of the operation object 104 is adjusted (updated) according to the pressing force.

Meanwhile, when the determination results of steps S412, S414, and S416 are "No", the process proceeds to step S420 and the depth adjustment mode is cancelled.

When it is determined in step S410 that the mode is not the depth adjustment mode ("No"), the process proceeds to step S422. In step S422, it is determined whether the thumb touches the display screen 102. When it is determined that the thumb touches the display screen 102 ("Yes"), the process proceeds to step S424. In step S424, it is determined whether the index finger is stopped in a constant range for a constant time. In this case, the constant range is a constant range above the operation object 104 in the pressing force detection region. When it is determined in step S424 that the index finger is stopped in the constant range for the constant time ("Yes"), the process proceeds to step S426. In step S426, the depth position of the operation object 104 and the pressing force are recorded as a reference. Next, in step S428, the mode changes to the depth adjustment mode.

Meanwhile, when the determination results of steps S422 and S424 are "No", the mode does not change to the depth adjustment mode, the process returns to step S410, and the following processing is repeated.

According to the embodiment described above, the user can adjust the depth position of the operation object 106 with the simple operation on the operation screen such as the touch panel. Therefore, the user can adjust the operation object 106 as a desired image to be three-dimensionally viewed.

Although the preferred embodiments of the present disclosure have been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

It should be understood by those skilled in the art that various modifications, combinations, sub-combinations and alterations may occur depending on design requirements and other factors insofar as they are in the scope of the appended claims or the equivalents thereof.

Additionally, the present technology may also be configured as below.

(1) An information processing apparatus comprising:
an operation amount acquiring unit that acquires an operation amount of an operation input on a display screen;
a depth position computing unit that computes a depth position of a three-dimensionally viewable operation object, on the basis of the operation amount; and
a display processing unit that executes processing for adjusting the depth position of the operation object on the basis of the depth position and displaying the operation object on the display screen.

(2) The information processing apparatus according to (1), wherein the operation input is a pinch-in operation or a pinch-out operation on the display screen.

(3) The information processing apparatus according to (1), wherein the operation input is an operation for moving an operation member displayed on the display screen.

(4) The information processing apparatus according to (1), wherein the operation input is an operation for causing a user's finger to come close to the display screen or causing the user's finger to become apart from the display screen.

(5) The information processing apparatus according to (1), wherein the operation input is an operation for pressing the display screen.

(6) The information processing apparatus according to (1), wherein the display processing unit adjusts the depth position of the operation object and adjusts positions of display objects around the operation object.

(7) The information processing apparatus according to (1), wherein the display processing unit executes processing for adjusting the depth position of the operation object on the basis of the depth position, when a predetermined operation is performed.

(8) The information processing apparatus according to (7), wherein the predetermined operation includes an operation of touching the display screen.

(9) The information processing apparatus according to (7), wherein the operation amount is obtained by detection of a touch sensor and the predetermined operation includes a pinch-in operation or a pinch-out operation on the display screen.

(10) The information processing apparatus according to (7), wherein the operation amount is obtained by detection of a proximity sensor and the predetermined operation includes an operation for stopping a user's finger for a constant time, in a detectable range of the proximity sensor above the display screen.

(11) The information processing apparatus according to (7), wherein the operation amount is obtained by detection of a pressure-sensitive sensor and the predetermined operation includes an operation for pressing the pressure-sensitive sensor by a user's finger, with a pressing force of a predetermined value or more.

(12) The information processing apparatus according to (9), wherein the operation amount is obtained by detection of a pressure-sensitive sensor and the predetermined operation includes an operation for pressing the pressure-sensitive sensor by a user's finger, with a pressing force of a predetermined value or more.

(13) An information processing method comprising:
acquiring an operation amount of an operation input on a display screen;
computing a depth position of a three-dimensionally viewable operation object, on the basis of the operation amount; and
adjusting the depth position of the operation object on the basis of the depth position and displaying the operation object on the display screen.

(14) A program for causing a computer to execute:
acquiring an operation amount of an operation input on a display screen;
computing a depth position of a three-dimensionally viewable operation object, on the basis of the operation amount; and
adjusting the depth position of the operation object on the basis of the depth position and displaying the operation object on the display screen.

What is claimed is:

1. An information processing apparatus comprising:
a touch sensor configured to detect touch information regarding one or more touches to a display device; and
circuitry, which is connected to the touch sensor, configured to:
determine, based on the touch information, a first touch operation including at least one of a pinch-in operation and a pinch-out operation at a first position in an image region displayed with the display device;
determine, based on the touch information, whether a second touch operation is given at a second position in the image region different from the first position;
control the display device in a first mode to move a three-dimensional image displayed in the image region in a depth direction of the image region, based on the first touch operation, when it is determined that the second touch operation is given at the second position; and
control the display device in a second mode to change a size of the three-dimensional image displayed in the image region while keeping a depth position of the three-dimensional image, based on the first touch operation, when it is determined that the second touch operation is not given at the second position,
wherein the second position is a predetermined position and the display device is controlled to change between the first mode and the second mode according to a change in the determination of whether the second touch operation is given at the predetermined position.

2. The information processing apparatus according to claim 1,
wherein the circuitry is further configured to control display of a right eye image of a user and display of a left eye image of the user to move the three-dimensional image in the depth direction.

3. The information processing apparatus according to claim 1,
wherein the touch sensor comprises a pressure-sensitive sensor configured to detect a pressing force, and
wherein the circuitry is further configured to move the three-dimensional image in accordance with the detected pressing force of the first touch operation.

4. The information processing apparatus according to claim 3,
wherein the circuitry is further configured to move the three-dimensional image when the detected pressing force is equal to or greater than a predetermined pressing force.

5. The information processing apparatus according to claim 1,
wherein the circuitry is further configured to move the three-dimensional image in the depth direction, based on the first touch operation, without changing a size of the three-dimensional image.

6. The information processing apparatus according to claim 1,
wherein the circuitry is further configured to control the display device to move, in a direction different from the depth direction, at least one image displayed around the three-dimensional image in accordance with the movement of the three-dimensional image based on the first touch operation.

7. The information processing apparatus according to claim 1,
wherein the circuitry is further configured to display an operation member in the image region to show the user that the three-dimensional image is movable in the depth direction of the image region.

8. The information processing apparatus according to claim 1, wherein the first touch operation and the second touch operation are separate operations.

9. The information processing apparatus according to claim 8,
wherein the circuitry controls the display device in response to the first touch operation according to the determined presence or absence of the second touch operation.

10. The information processing apparatus according to claim 1,
wherein the touch sensor comprises a capacitive sensor.

11. The information processing apparatus according to claim 1,
wherein the circuitry controls the display device in response to the first touch operation according to the determined presence or absence of the second touch operation.

12. An information processing method, performed via at least one processor, the method comprising:
detecting touch information regarding one or more touches to a display device;
determining, based on the touch information, a first touch operation including at least one of a pinch-in operation and a pinch-out operation at a first position in an image region displayed with the display device;
determining, based on the touch information, whether a second touch operation is given at a second position in the image region different from the first position;
controlling the display device in a first mode to move a three-dimensional image in a depth direction of the image region, based on the first touch operation, when it is determined that the second touch operation is given at the second position; and
controlling the display device in a second mode to change a size of the three-dimensional image displayed in the image region while keeping a depth position of the three-dimensional image, based on the first touch operation, when it is determined that the second touch operation is not given at the second position,
wherein the second position is a predetermined position and the display device is controlled to change between the first mode and the second mode according to a change in the determination of whether the second touch operation is given at the predetermined position.

13. A non-transitory computer-readable storage medium having embodied thereon a program, which when executed by a computer, causes the computer to execute a method, the method comprising:
detecting touch information regarding one or more touches to a display device;
determining, based on the touch information, a first touch operation including at least one of a pinch-in operation and a pinch-out operation at a first position in an image region displayed with the display device;
determining, based on the touch information, whether a second touch operation is given at a second position in the image region different from the first position;
controlling the display device in a first mode to move a three-dimensional image in a depth direction of the image region, based on the first touch operation, when it is determined that the second touch operation is given at the second position; and
controlling the display device in a second mode to change a size of the three-dimensional image displayed in the image region while keeping a depth position of the three-dimensional image, based on the first touch operation, when it is determined that the second touch operation is not given at the second position,
wherein the second position is a predetermined position and the display device is controlled to change between the first mode and the second mode according to a change in the determination of whether the second touch operation is given at the predetermined position.

* * * * *